(12) United States Patent
Liao et al.

(10) Patent No.: US 6,522,532 B2
(45) Date of Patent: Feb. 18, 2003

(54) CABLE DOCKING SYSTEM AND METHOD FOR A COMPUTER

(75) Inventors: Reynold Liao, Austin, TX (US); Cassius J. Mullen, Georgetown, TX (US)

(73) Assignee: Dell Products L.P., Round Rock, TX (US)

( * ) Notice: Subject to any disclaimer, the term of this patent is extended or adjusted under 35 U.S.C. 154(b) by 137 days.

(21) Appl. No.: 09/756,628

(22) Filed: Jan. 8, 2001

(65) Prior Publication Data

US 2002/0089822 A1 Jul. 11, 2002

(51) Int. Cl.[7] .............................. G06F 1/16; H05K 7/00
(52) U.S. Cl. ...................... 361/686; 361/683; 439/133; 439/362; 312/223.1
(58) Field of Search ................................ 361/679–686, 361/724–727, 747; 439/362, 133, 304; 312/223.1–223.3

(56) References Cited

U.S. PATENT DOCUMENTS

| | | | | |
|---|---|---|---|---|
| 5,288,241 A | * | 2/1994 | Davidge et al. ............ 439/133 |
| 5,793,606 A | * | 8/1998 | Cubbage et al. ............ 361/681 |
| 5,982,614 A | * | 11/1999 | Reid ........................... 361/686 |
| 5,995,366 A | | 11/1999 | Howell et al. |
| 6,061,234 A | | 5/2000 | Broder et al. |
| 6,084,691 A | * | 7/2000 | Tsai et al. .................... 361/686 |
| 6,246,578 B1 | * | 6/2001 | Wei et al. .................... 361/686 |
| 6,297,963 B1 | * | 10/2001 | Fogle ........................... 361/683 |
| 6,304,459 B1 | * | 10/2001 | Toyosato et al. ............ 361/686 |
| 6,407,914 B1 | * | 6/2002 | Helot ........................... 361/686 |

* cited by examiner

Primary Examiner—Darren Schuberg
Assistant Examiner—Lisa Lea-Edmonds
(74) Attorney, Agent, or Firm—Haynes and Boone, LLP

(57) ABSTRACT

A cable docking system and method according to which a connector is secured to one end of a cable, and a docking box is connected to the other end of the cable. A terminal on the connector is engaged with a corresponding terminal on an electronic device, such as a computer, and a locking mechanism locks the connector to the device with the terminals in engagement.

18 Claims, 3 Drawing Sheets

CABLE DOCKING SYSTEM AND METHOD FOR A COMPUTER

BACKGROUND

The present disclosure relates, in general, to a cable docking system and method for a computer, more particularly, to such a system in which a cable connector can be locked in electrical engagement with the computer.

Docking stations and port replicators for portable computers, such as laptop computers and notebook computers, are very popular. Recent designs include cable docking systems according to which the traditional docking stations and port replicators are eliminated in favor of a docking box that is stored underneath the desk or on the floor, and is connected to the portable computer by a connecting cable.

The docking box contains essentially the same electronics as a docking station or port replicator, as well as ports, terminals, connectors, and the like to permit connection to monitors, printers, etc. in the same manner as the docking stations and port replicators. One end of a connecting cable is connected to the docking box, and the other end of the cable is provided with a connector, usually of the multipin variety, that is connected to the portable computer. Thus, rather than being docked, the portable computer is simply connected to the latter end of the connecting cable. Thus, the connection can be made quickly and easily, and considerable desk space is saved when compared to the conventional docking stations and port replicators.

However, security issues are raised with these types of cable docking systems because it is fairly easy for an unauthorized person to simply disconnect the cable from the portable computer and abscond with the computer.

Therefore, what is needed is a cable docking system which provides increased security.

SUMMARY

To this end, an embodiment of the present disclosure is directed to a cable docking system and method according to which a connector is secured to one end of a cable, a terminal on the connector is engaged with a corresponding terminal on a computer, or other signal generating device, and a locking mechanism locks the connector or device with the terminals in engagement.

DETAILED DESCRIPTION

Figure 1:
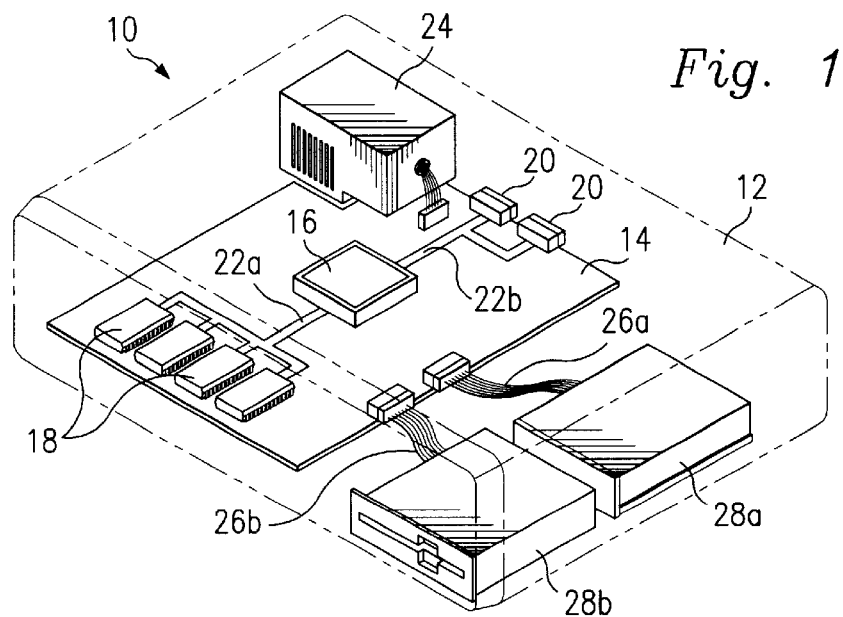
FIG. 1 is a diagrammatic view of a computer according to an illustrative embodiment.

An embodiment of the present disclosure is shown in FIG. 1 in connection with a portable computer, referred to, in general, by the reference numeral 10. The computer 10 includes a chassis 12 in which a motherboard 14 is mounted. A processor 16 is connected to the motherboard 14, and a plurality of memory devices, or modules, 18 and two input/output (I/O) devices 20 are mounted on the motherboard. Two buses 22a and 22b are also provided on the motherboard 14 and connect the processor 16 to the memory modules 18 and to the input/output devices 20, respectively. The memory modules 18 provide storage to facilitate execution of computer programs by the processor 16.

A power supply 24 is connected to the motherboard 14, and a pair of cable assemblies 26a and 26v connect to the motherboard 14 to a hard drive unit 28a and a disk drive 28b, respectively. It is understood that other components, electrical traces, electrical circuits and related devices (not shown) are provided in the chassis 12. Because these are all conventional, they will not be described in any further detail.

Figure 2:
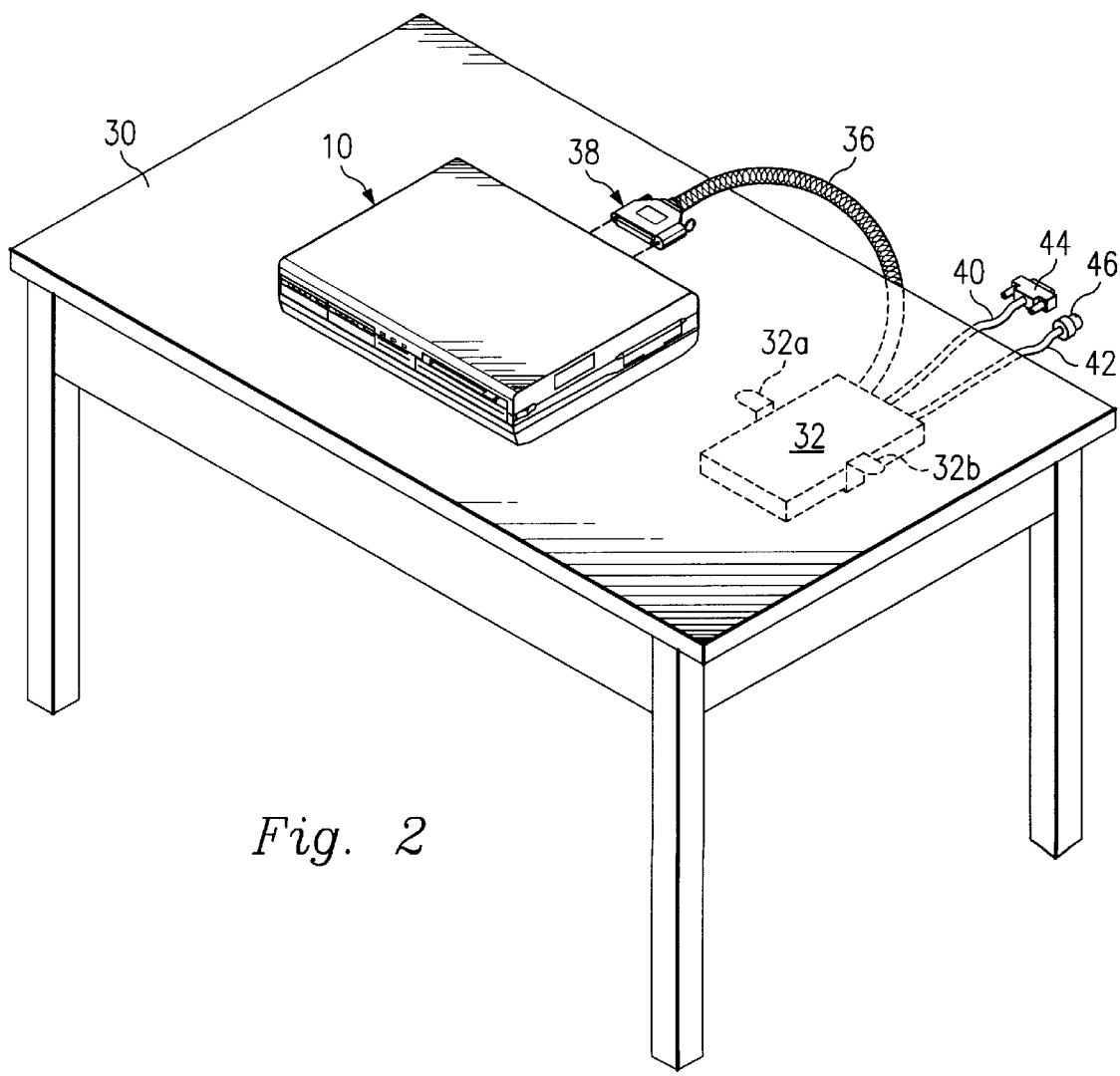
FIG. 2 is a isometric view of the computer of FIG. 1 shown in connection with the cable docking system according to an illustrative embodiment.

A computer system including the computer 10 is shown in FIG. 2. The computer 10 is in the form of a portable computer, such as a laptop computer or notebook computer, which contains the above components in addition to a conventional keyboard and display (not shown). The computer 10 is shown resting on a table 30, and a docking box 32 is mounted underneath the table. In the latter context, two tabs 32a and 32b are provided that extend from either side of the box 32 for bolting the box to the table.

One end of a cable 36 has a multipin connector 38 attached thereto which is adapted to be connected to the computer 10 in a manner to be described. The other end of the cable 36 can be permanently attached to the box 32, or can have a connector, similar or identical to the connector 38, for attaching to an appropriate terminal on the box. The cable 36 is preferably constructed of a relatively heavy, reinforced steel braiding shielding material to increase its resistance to cutting.

Two cables 40 and 42 are provided that have connectors 44 and 46, respectively attached to one end thereof for connecting to ancillary equipment, such as a monitor, keyboard, printer, or the like (not shown). The other ends of the cables 40 and 42 can be permanently attached to the box 32, or can have a connector, similar to the connectors 44 and 46, for attaching to an appropriate terminal or receptacle on the box 32.

Figure 3:
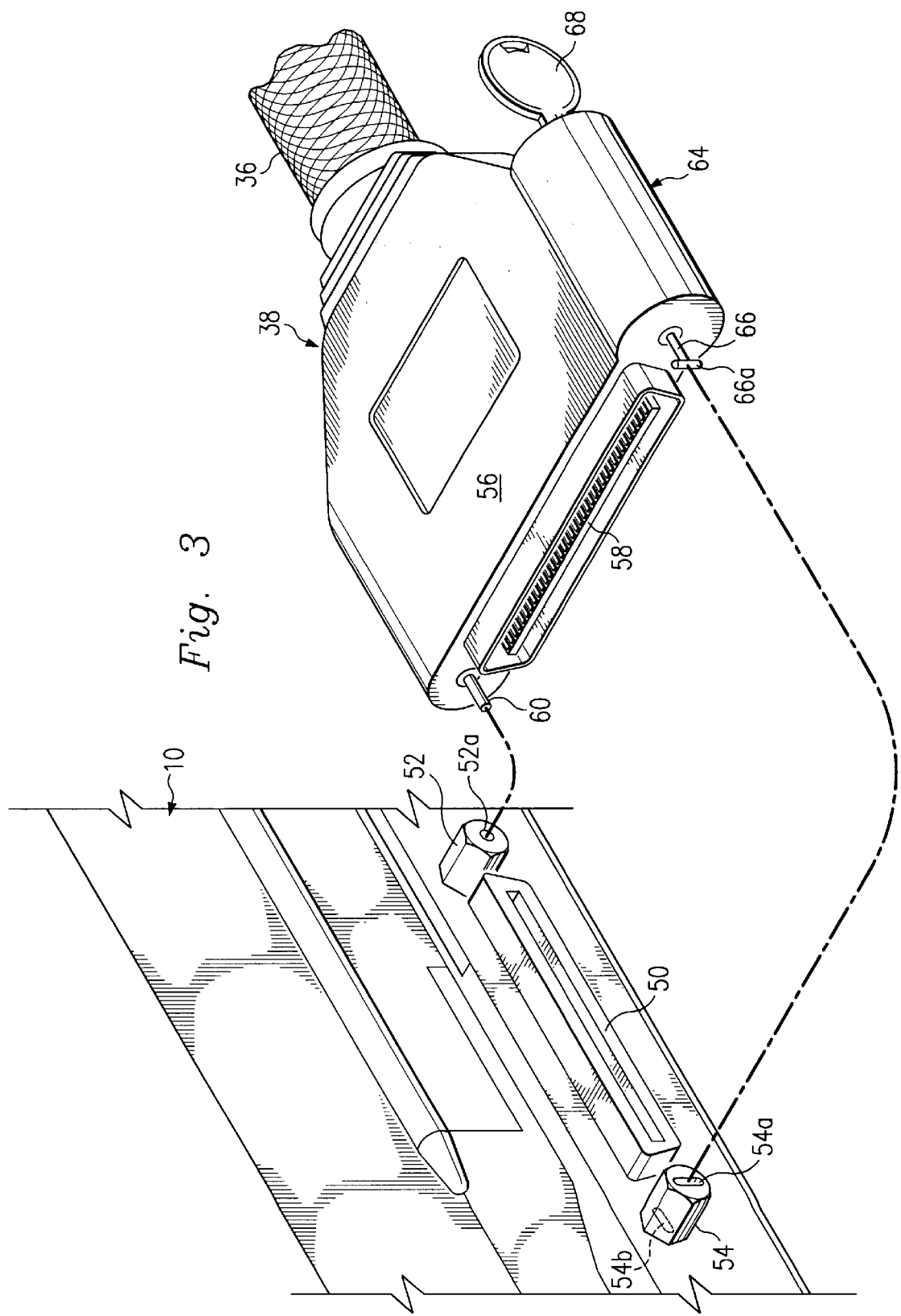
FIGS. 3 and 4 are enlarged isometric views of a portion of the cable docking system of FIG. 2, shown disconnected and connected, respectively.

Referring to FIG. 3, the rear end of the computer 10 is provided with a conventional female terminal, or receptacle, 50. Also provided are two posts 52 and 54 extending from the latter end of the computer and adjacent the respective ends of the terminal 50. The post 52 is provided with a central bore 52a and the post 54 is provided with a slot 54a, for reasons to be described.

The connector 38 includes a body member 56 having a conventional male terminal 58 formed on its leading end for insertion in the terminal 50 of the computer 10 to electrically connect the connector 38, and therefore the cable 36 and the docking box 32, to the terminal 50, and therefore the computer 10. Thus, signals from the computer 10 can be transferred to the docking box 32 for operating the above-mentioned ancillary equipment. Because the terminals 50 and 58 are conventional, they will not be described in detail.

A pin 60 projects outwardly from a side portion of the body member 56, and is adapted to be inserted into the bore 52a of the post 52. The pin 60 functions as a guide to properly align the terminal 58 relative to the terminal 50.

A locking mechanism 64 is provided in the other side portion of the body member 56 and includes a pin 66 mounted for rotation in the latter side portion. The leading end portion of the pin 66 projects outwardly from the body member 56 and is provided with a cross piece 66a that extends perpendicular to the axis of the pin and is attached to the pin in any know manner. The locking mechanism 64 also includes a key 68 that extends in a properly configured opening in the other end of the latter side portion of the body member 56. The arrangement is such that rotation of the key causes corresponding rotation of the pin 66 and the cross piece 66a for approximately ninety degrees.

Figure 4:
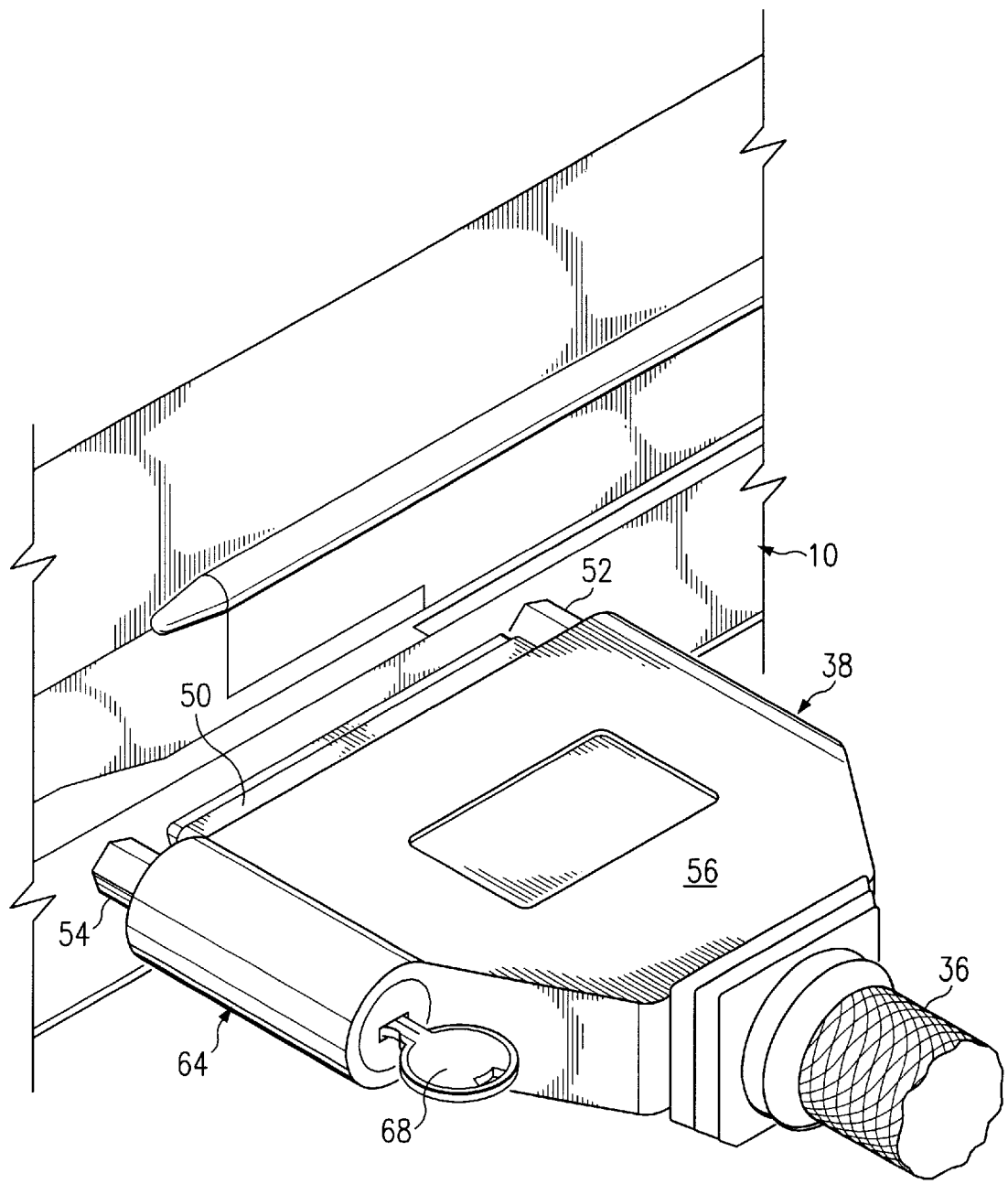

Although shown in phantom in the drawings, it is understood that an additional slot 54b is provided in the interior of the post 54 that extends perpendicular to the slot 54a. Therefore, when the pin 66 and the cross piece 66a are inserted in the slot 54a and rotated approximately ninety degrees by the key 68, the cross piece 66a moves into the additional slot to retain the crosspiece, and therefore the pin, in the post 54, as shown in FIG. 4. The connector 38, and therefore the terminal 58 are thus locked to the computer 10 as shown with the terminals 50 and 58 in engagement, The key 68 can then be removed to insure that the connector 38 is retained in its locked position. Of course, the connector 38 can be unlocked from the terminal 50 by simply reversing the above steps. This type of looking mechanism is known as a "Kensington Lock" and is, per se, fully disclosed at the website (www.kensington.com) of the Kensington Technology Group, with the disclosure hereby being Incorporated by reference.

Therefore, security against theft of the computer system disclosed above, including the computer and the locking system, is limited only by the strength and resistance to cutting of the cable and thus makes it very difficult, if not impossible, for an intruder to remove the computer from the locking system and abscond with the computer.

It is understood that variations may be made in the above without departing from the scope of the disclosed embodiments. For example, the above embodiment is not limited to the particular locking mechanism 64. Also, the locking mechanism could include a lock that is password-activated by the software in the computer. Further, the docking box 32 can be disposed at other locations such as the floor adjacent the desk 30. Still further, the bore 52a could be internally threaded and the pin 60 could be externally threaded and rotatably mounted in the side portion of the body member to enable it to be rotated to place it in threaded engagement with the bore. Moreover, the locking mechanism 64 can also be used in connection with the post 52 of the computer 10. Also, the end of the cable 36 opposite the end that is connected to the connector 38 can be connected to the box 32 by a connector which can be conventional, or which can be identical to the connector 38 to enable the connector to be looked to the box in the above manner. Further, the terminals 50 and 58 can be replaced with terminals of a different type to establish the electrical connection between the cable 36 and the computer 10. Still further, the computer 10 does not necessarily have to be a portable computer and the embodiment described above is equally applicable to other environments according to which an electrical signal transferring cable is locked to a electrical signal generating device other than a computer.

Other modifications, changes and substitutions are intended in the foregoing disclosure and in some instances some features of the disclosure will be employed without a corresponding use of other features. Accordingly, it is appropriate that the appended claims be construed broadly and in a manner consistent with the scope of the disclosure.

What is claimed is:

1. A computer system comprising a computer comprising:
   a chassis having an exterior surface;
   a processor mounted in the chassis;
   a storage coupled to the processor;
   a memory coupled to the processor to provide storage to facilitate execution of computer programs by the processor;
   a first terminal mounted on the exterior surface of the chassis;
   a cable;
   a docking box connected to one end of the cable; and
   a connector secured to the other end of the cable and comprising a body member and a second terminal extending from the body member for engaging the first terminal on the chassis, and a locking mechanism for locking the connector to the chassis with the first and second terminals in engagement;
   a post disposed on the exterior surface of the chassis and having a bore formed therein; and
   a guide pin mounted on the body member for extending in the bore.

2. The system of claim 1 wherein the locking mechanism comprises:
   a post disposed on the exterior surface of the chassis adjacent the first terminal and having slots formed therein; and
   a pin assembly rotatably mounted on the body member and adapted to be inserted into the slots and rotated to effect the locking.

3. The system of claim 2 wherein the locking mechanism permits the pin assembly to be rotated only by a key.

4. The system of claim 1 wherein the first and second terminals provide electrical connections between the computer and the connector, and therefore the cable and the docking box.

5. A cable docking system for a computer, the system comprising:
   a cable;
   a docking box connected to one end of the cable;
   a connector secured to the other end of the cable and comprising;
   a body member;
   a cable terminal extending from the body member for engaging a corresponding terminal on the computer; and
   a locking mechanism for locking the connector to the computer with the terminals in engagement;
   a post disposed on the computer and having a bore formed therein; and
   a guide pin mounted on the body member for extending in the bore.

6. The system of claim 5 wherein the locking mechanism comprises:
   a post disposed on the exterior surface of the computer adjacent the corresponding terminal and having slots formed therein; and
   a pin assembly rotatably mounted on the body member and adapted to be inserted into the slots and rotated to effect the locking.

7. The system of claim 6 further wherein the locking mechanism permits the pin assembly to be rotated only by a key.

8. The system of claim 5 wherein the terminals provide electrical connections between the computer and the connector, and therefore the cable and the docking box.

9. A cable locking method for an electrical signal generating device, the method comprising:
   securing a connector to one end of a cable;
   engaging a cable terminal on the connector with a corresponding terminal on the device; and
   locking the connector to the device with the terminals in engagement;

providing a bore in the device and a guide pin on the connector, and inserting the guide pin into the bore.

10. The method of claim 9 wherein the device is a computer and further comprising:

connecting a docking box to the other end of the cable.

11. The method of claim 10 wherein the terminals provide electrical connections between the computer and the connector, and therefore the cable and the docking box.

12. The method of claim 9 wherein the step of locking comprises rotatably mounting a pin assembly on the connector and inserting the pin assembly into slots provided on the device.

13. The method of claim 12 further comprising:

permitting the pin assembly to be rotated only by a key.

14. An electrical system comprising:

an electrical signal generating device;

a cable for transferring electrical signals;

a connector secured to one end of the cable and having a cable terminal for engaging a corresponding terminal on the device; and a locking mechanism for locking the connector to the device with the terminals in engagement;

a post disposed on the device and having a bore formed therein; and a guide pin mounted on the connector for extending in the bore.

15. The system of claim 14 wherein the device is a computer and further comprising a docking box connected to the other end of the cable.

16. The system of claim 15 wherein the terminals provide electrical connections between the computer and the connector, and therefore the cable and the docking box.

17. The system of claim 14 wherein the locking mechanism comprises:

a post disposed on the exterior surface of the device adjacent the corresponding terminal and having slots formed therein; and a pin assembly rotatably mounted on the connector and adapted to be inserted into the slots and rotated to effect the locking.

18. The system of claim 17 wherein the locking mechanism permits the pin assembly to be rotated only by a key.

* * * * *